March 4, 1958 G. G. HOWARD 2,825,588
FLEXIBLE HOSE COUPLING HAVING STRENGTHENING MEANS
Filed May 18, 1955
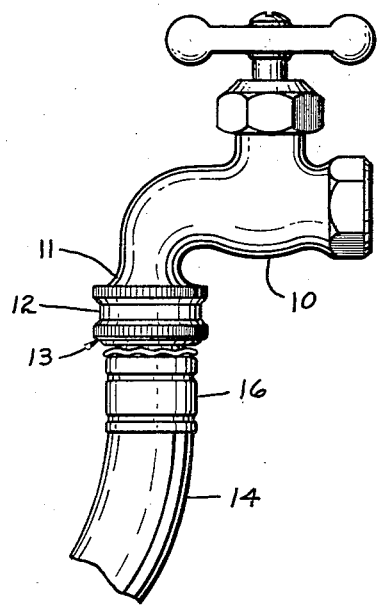
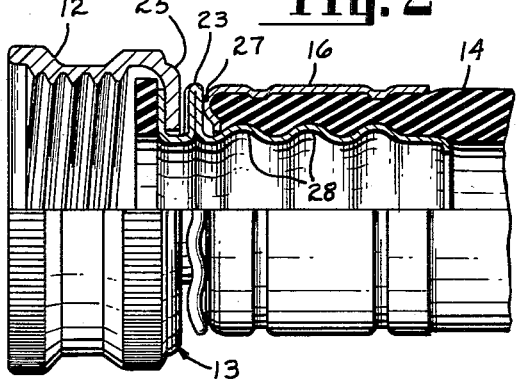
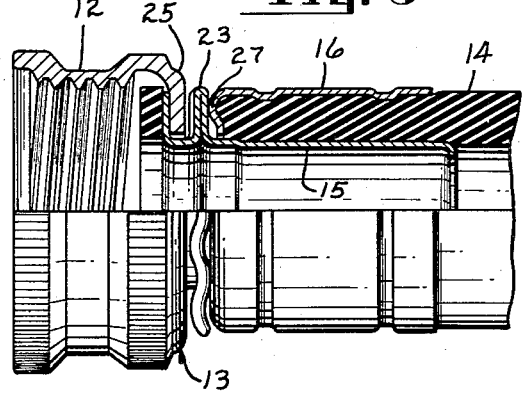
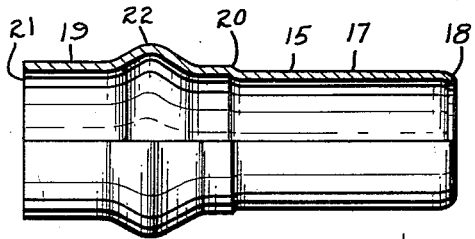
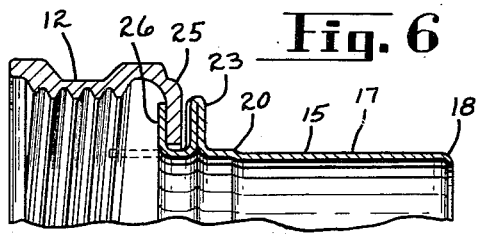
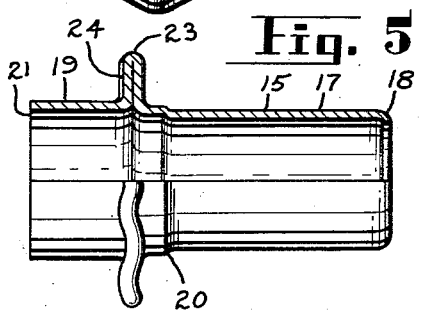
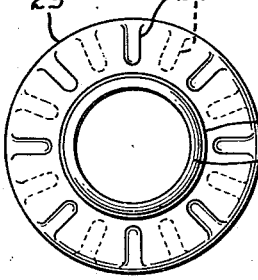
INVENTOR
George G. Howard
BY
H. F. Johnston
ATTORNEY

United States Patent Office 2,825,588
Patented Mar. 4, 1958

2,825,588

FLEXIBLE HOSE COUPLING HAVING STRENGTHENING MEANS

George G. Howard, Waterbury, Conn., assignor to Scovill Manufacturing Company, Waterbury, Conn., a corporation of Connecticut Application May 18, 1955, Serial No. 509,254

2 Claims. (Cl. 285—253)

This invention relates to hose couplings and to the method of making one that is adapted for use on automatic appliances such as automatic washing machines and the like.

In the field of automatic appliances such as washing machines, dish washers, clothes driers, etc. in the past it was customary to tie machines directly into the plumbing system as a permanent fixture. More recently it has been the trend to provide such appliances as a movable unit and to connect them into the plumbing system through detachable hose connections and couplings with the usual outlet taps of a domestic plumbing system.

The fact that the above apparatus is movable and when connected into the water supply system by hose connections would permit such devices being moved beyond the safety limits of the hose connections and consequently put a severe lateral strain on the end coupling to such an extent that portions of the coupling would be bent and distorted resulting in leaky and troublesome couplings.

The couplings used on hose connections for a washing machine are of the female type wherein a swivel nut is joined to the coupling unit for detachably connecting the hose to the usual plumbing outlet tap. One of the reasons that the couplings used on hose connections of the above mentioned appliances used to break down or be easily ruined was because in joining the couplings to a hose it was customary to expand the nipple outwardly toward a ferrule member and tightly embrace the hose material therebetween. In order to expand the nipple portion of a coupling, it was necessary to have the nipple in an annealed state which would leave that portion of the nipple connected to the nut in a relatively soft state and subject to easy distortion.

It is one of the objects of my invention to improve and strengthen the coupling in making that portion of the nipple connected to the nut substantially stronger by reason of its construction and the method in which the nipple is made and joined to the nut.

It is another object of the invention to provide a female type of hose coupling in which the nipple portion to be subsequently expanded in the end of a hose section will be left in a soft annealed state while that portion that is attached to the nut will be work-hardened and made stronger so as to withstand any abnormal lateral strains that such couplings are subjected to when attached to hose used in association with movable apparatus.

Additional objects, advantages and features of the invention will be apparent from the following description when considered in conjunction with the accompanying drawing, wherein:

Fig. 1 is an elevational view of an outlet tap or faucet showing a coupling attached thereto embodying my invention.

Fig. 2 is a part sectional and part elevational view of the hose coupling as it appears secured to the end of a hose.

Fig. 3 is a similar view showing the coupling assembled to the hose end before final attachment.

Figs. 4, 5 and 6 show the method steps used in making the nipple and attaching it to a swivel nut, and Fig. 7 is an end view of the nipple looking from the right of Fig. 5.

Referring now to the drawing, the numeral 10 designates a conventional tap or faucet having a threaded end 11 to which a swivel nut 12 of a female coupling unit 13 may be detachably connected. The coupling unit 13 in Fig. 2 is shown secured to the end of a hose 14 and in Fig. 3 is shown assembled to but not secured to the hose 14. This coupling consists essentially of the internally threaded swivel nut 12, a nipple 15 inserted into the end of said hose and a ferrule 16 surrounding the end of said hose.

As pointed out in the objects, it is the purpose of this invention to leave that portion of the nipple that is inserted into the end of a hose in an annealed state to permit a subsequent expanding operation while that portion of the nipple that is attached to the swivel nut is work-hardened by a special forming operation to strengthen the connection with said nut.

As shown in Fig. 4 the nipple 15 is initially formed to provide a tubular shank 17 having a leading rounded end 18 to permit easy insertion into a hose end. The opposite end of the nipple has a slightly enlarged section 19 joined to the shank 17 by a shoulder 20 and having an opposed open annular end 21. The enlarged nipple section 19 is formed with an intermediate outwardly expanding circumferential bulbous annulus 22. The nipple 15, when processed to the state as shown in Fig. 4, is subjected to an annealing operation to temper the metal for subsequent reworking operations. After the annealing operation the nipple is subjected to an axial collapsing operation wherein the bulbous annulus 22 is reformed into a double walled flange 23. In order to further work-harden the flange 23, either during the time the annulus 22 is being collapsed or by an additional operation, a series of radial recesses 24 are struck alternately inwardly from opposite sides of said flange 23 to reshape the same into a more or less sinuous configuration as seen in Fig. 5, thus increasing substantially its inherent strength. By forming the flange 23 as explained above, a relatively wide flange can be produced, the intent being to provide a flange that will be substantially coextensive with the nut end flange 25.

After the nipple 15 has been formed as shown in Fig. 5, the next step involves the assembly of the nut 12. The nut 12 is formed with an inturned flange 25 that is slipped over the enlarged section 19 of the nipple 15 adjacent the double-walled flange 23 after which the annular end 21 of the enlarged section 19 is upset or flared outwardly into a flat end flange 26 disposed against the inside of the nut flange 25. The flange 26 is also substantially as large as the double-walled flange 23. It will be noted that there is very little clearance between the nut flange 25 when it is embraced between the nipple flanges 23 and 26, nevertheless, leaving sufficient clearance between said end flange 26 and the adjacent high points of the double-walled flange 23 opposite the recesses 24 to permit the nut flange 25 to freely rotate therebetween without any binding action.

From the above construction and method of making and assembling, it will be apparent that the spaced nipple flanges 23 and 26 which embrace the nut flange 25 are work-hardened by the forming and reforming operations to considerably strengthen that portion of the coupling to which the nut is attached and still leave the nipple shank in an annealed state as provided at the Fig. 4 step so as to permit any subsequent forming operation to the nipple shank either after assembly to the hose or before assembly to the hose. If the nipple shank 17 is to be reformed after assembly, a ferrule 16 will first be slipped over the end of the hose after which the nipple 15 will be inserted into said hose until the double-walled flange 23 abuts the end flange 27 of said ferrule 16 and then the nipple may be expanded by a suitable tool to provide outward ribs 28 embracing the rubber material therebetween, the innermost rib serving to lock the ferrule 16 to the nipple against axial displacement. Another manner in which the coupling may be attached to a hose end is to knurl ribs into the nipple shank 17 before assembly and after assembly a screw clamp or a contracted ferrule may be tightened about the hose within the length of the nipple shank 17.

As seen in Fig. 2 the fact that the ferrule 16 is locked to the nipple 15 with the ferrule flange 27 disposed adjacent the double-walled flange 23 of said nipple will further serve to back up and support the flange 23 against deformation in case the coupling is subjected to severe lateral strains due to any strong side pull on the hose relative to the axis of the coupling when attached to a faucet.

One form of the invention is presented herein for the purpose of exemplification, but it will be appreciated that the invention is susceptible of changes and other structurally modified forms coming equally within the scope and spirit of the appended claims.

What I claim is:

1. As a new article of manufacture, a female part of a separable hose coupling comprising a nipple and a nut adapted to be anchored in place on the end of a hose section by expansion of the nipple after the nipple has been entered into the end of said hose section, said nut having an inwardly formed end flange, said nipple having an end flange and a double-walled flange spaced from said end flange each formed integral therewith by flaring a portion of the nipple outwardly, said double-walled flange being substantially coextensive with the nut flange, said nut flange being swivelly connected between said nipple flanges by a relatively close swivel fit, and said double-walled flange provided with a series of radial recesses stamped alternately on opposite sides to deform said double-walled flange into a circumferential sinuous state and serving to increase the strength of said flange against deformation due to any tilting action of the nipple relative to the nut.

2. In combination, a female hose coupling comprising a sheet metal nipple, a nut and a ferrule, said nipple having an end flange and a double-walled flange spaced from said end flange, both said flanges formed as an integral part of said sheet metal nipple and being of the same material as the remainder of the nipple, said nut having a flanged end swivelly engaged between said nipple flanges, said double-walled flange provided with a series of alternately stamped radial recesses to deform said flange into a circumferential sinuous state and serving to strengthen it against lateral deformation, both of said nipple flanges being substantially coextensive with the nut flange, said ferrule also having an end flange positioned adjacent said double-walled flange, that portion of said nipple inserted into the hose having a series of expanded circumferential ribs one of which is positioned adjacent said ferrule end flange to lock said ferrule to said nipple and thereby further strengthening said double-walled flange against lateral deformation.

References Cited in the file of this patent

UNITED STATES PATENTS

| | | |
|---|---|---|
| 454,647 | Hallas | June 23, 1891 |
| 1,533,886 | Mueller | Apr. 14, 1925 |
| 2,631,047 | Spender | Mar. 10, 1953 |
| 2,634,786 | Stinchcomb | Apr. 15, 1953 |
| 2,675,844 | Knohl | Apr. 20, 1954 |